May 31, 1932. K. L. SCOTT 1,860,820
METHOD OF PRODUCING MAGNETIC CORES
Filed March 6, 1929
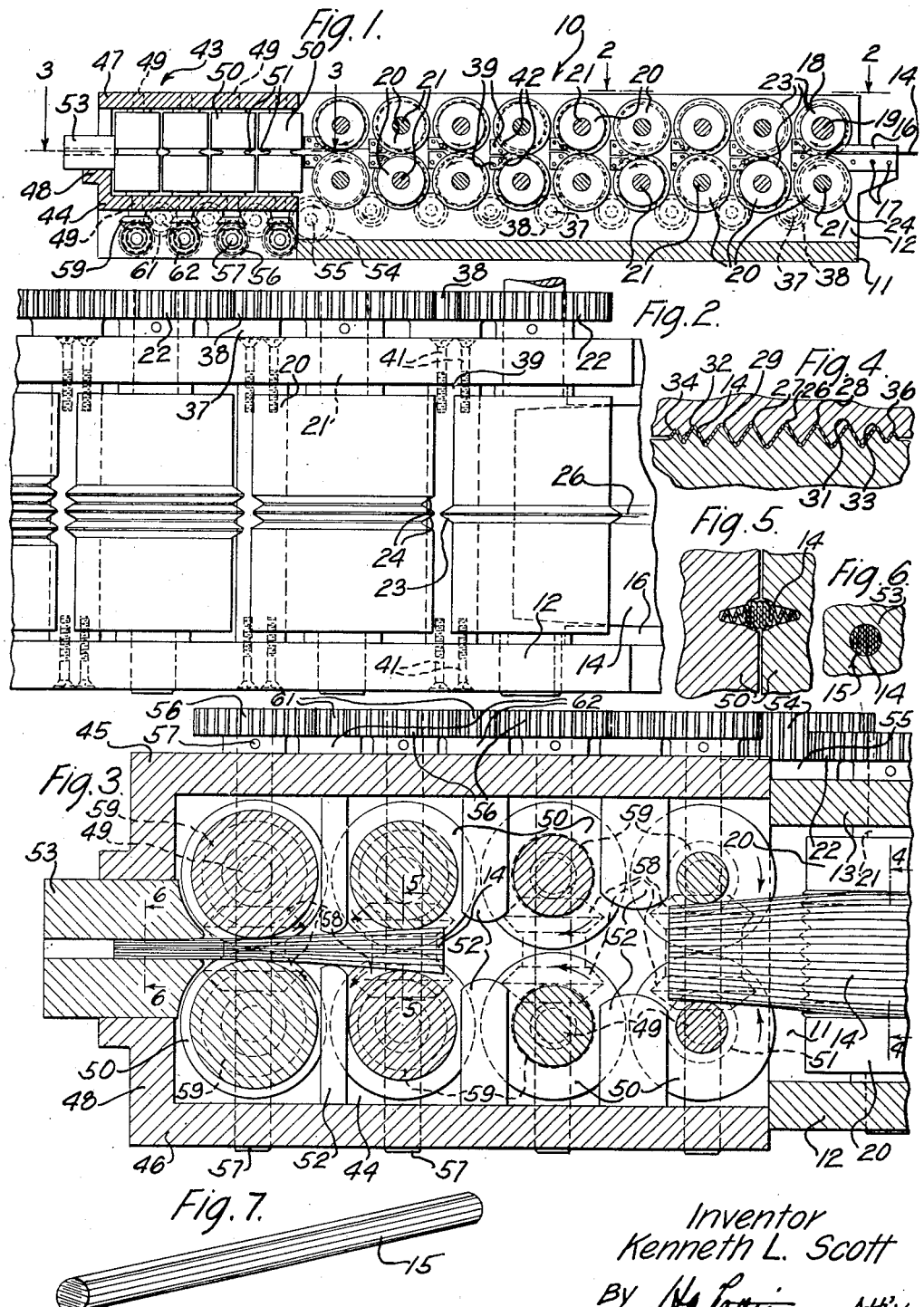
Inventor
Kenneth L. Scott
By (signature) Att'y.

Patented May 31, 1932

1,860,820

UNITED STATES PATENT OFFICE

KENNETH LOYAL SCOTT, OF WESTERN SPRINGS, ILLINOIS, ASSIGNOR TO WESTERN ELECTRIC COMPANY, INCORPORATED, OF NEW YORK, N. Y., A CORPORATION OF NEW YORK

METHOD OF PRODUCING MAGNETIC CORES

Application filed March 6, 1929. Serial No. 344,867.

This invention relates to a method of producing magnetic cores, and more particularly to a method of producing magnetic cores of laminated construction.

Heretofore, in some instances, it has been the practice in making ringers, induction coils and other types of telephonic apparatus employing electromagnets to use a solid core, or a laminated type of core composed of a number of comparatively thin strips of material.

Objects of the present invention are to provide a method of manufacturing cores which will be economical, efficient and productive of a one-piece type of laminated core possessing predetermined electrical and mechanical characteristics.

In accordance with one embodiment of the invention, a sheet of magnetic material is passed through a series of rollers having circumferential cooperating forming beads and grooves which progressively produce corrugations on the sheet outwardly from the center thereof. The corrugation produced by the first pair of rollers determines the greatest cross-sectional dimension of the product, and the depth of the corrugations produced by the remaining rollers determines the character of the cross section of the product. The corrugated sheet is then passed through a second series of rollers which are driven by a series of reducing gears, meshing with the rollers of the first series, to feed the material through the system at a constant speed. The second series of rollers compresses the corrugated sheet edgewise to tightly close the corrugations beginning with the innermost and produce in the resulting one-piece type of laminated core the predetermined cross section. Thereafter the core is heat treated to form oxide insulating coatings between adjacent surfaces of the laminations and to produce the optimum magnetic characteristics in the core.

It is believed that a complete understanding of the invention may be secured by referring to the following description taken in conjunction with the accompanying drawings illustrating one embodiment thereof, in which Fig. 1 is a side elevation, partly in section, of an apparatus and which may be used in practicing the improved method;

Fig. 2 is an enlarged fragmentary section taken on the line 2—2 of Fig. 1;

Fig. 3 is an enlarged fragmentary section taken on line 3—3 of Fig. 1;

Fig. 4 is an enlarged fragmentary section taken on the line 4—4 of Fig. 3;

Fig. 5 is an enlarged corresponding section taken on the line 5—5 of Fig. 3;

Fig. 6 is an enlarged corresponding section taken on the line 6—6 of Fig. 3, and Fig. 7 is a perspective view of a completed core.

Referring to the drawings wherein identical reference numbers indicate similar parts on the several views, Fig. 1 shows a forming apparatus, denoted generally by the numeral 10 comprising a base 11, and opposite sides 12 and 13 perpendicularly disposed with reference to the base 11.

In describing the details of construction of the apparatus, it will be necessary to include references to certain features of the manner of its operation. It will be observed that raw or sheet material 14 is fed into a portion of the apparatus corresponding to the right-hand end of the apparatus 10 shown in Fig. 1 of the drawings. In its operation, the apparatus acts to move the material constantly to the left, from which portion of the apparatus completely formed product is discharged as a one piece type laminated prismatic core 15. Accordingly, where a number of similar elements engage the material in succession, they will be individually distinguished by referring to them in accordance with the order in which they engage the material.

A pair of oppositely disposed guide plates 16 are rigidly secured to the sides 12 and 13 of the forming apparatus by screws 17, and furnish a channel through which the material 14 is fed to a power roller 18. The power roller 18 is mounted upon a shaft 19 suitably journalled so as to be readily rotatable in the sides 12 and 13. The power roller comprises one of a series of eighteen forming rollers, the remaining units 20 of which are mounted upon rotatable horizontal shafts 21, journalled in the sides 12 and 13. The shafts 19 and 21 project beyond the side 13 a sufficient distance to permit mounting on the projecting portion of each a toothed gear 22. The forming rollers 20 are arranged in parallel upper and lower rows of nine rollers each and are so positioned as to permit the gears 22 of the rollers in the upper row to mesh with the like gears of the rollers in the lower row. The series of forming rollers 20 include nine spaced beaded rollers and nine spaced grooved rollers respectively arranged in such manner that a beaded roller of the upper row is opposite a grooved roller of the lower row, and immediately adjacent a grooved roller in the upper row. In other words, considering the rollers with regard to their operative sequence, the first roller of the upper row (power roller 18) is of the beaded order, the first roller of the lower row is of the grooved order, the second roller of the upper row is of the grooved order and the second roller of the lower row is of the beaded order; and such staggered relationship is continued throughout the series to the last pair of rollers 20, the upper one of which is of the beaded order and the lower of which is of the grooved order.

The power roller 18 or the first beaded roller is provided with a centrally disposed circumferential V-shaped bead 23 (Figs. 1 and 2) which coincides with and projects into a centrally disposed circumferential V-shaped groove 24 with which the opposite roller is provided. The bead and groove are of a depth sufficient to form a longitudinal corrugation 26 (Fig. 4) in the center of the sheet of magnetic material 14 which may be inserted and passed between them, which corrugation will be equal in depth to the greatest cross-sectional dimension of the core 15 (Fig. 7) to be produced. The second beaded roller is provided with two circumferential V-shaped beads 23 which project into two like-shaped grooves 24 with which the opposite roller is provided. The two beads and their respective cooperating grooves are spaced an equal distance from center of the rollers to form in the sheet 14 a side wall for two additional corrugations 27 and 28, one on either side of the initial corrugation 26, each corrugation being of a depth slightly less than the depth of the corrugation 26. The third beaded roller is provided with three beads which project into and cooperate with three circumferential grooves of the third grooved roller. The three beads and the respective grooves are centered with respect of the rollers and the bead 23 of the first roller, in order that the corrugations 27 and 28 may be imparted to the sheet during its passage between the third pair of rollers 20, thus completing the corrugations commenced by the second pair of rollers. The fourth beaded roller is provided with four beads which project into four grooves of the fourth grooved roller. The four beads and the cooperating grooves are spaced an equal distance from center, the two outermost acting to form in the sheet a side wall for two additional corrugations 29 and 31, one on either side of the prior-formed corrugations, and each to be of a depth slightly less than the depth of the corrugations 27 and 28. The fifth beaded roller is provided with five beads which project into five grooves of the fifth grooved roller. The five beads and cooperating grooves are centered with respect of the rollers in order that the corrugations 29 and 31 may be completed in the sheet 14 during its passage between the fifth pair of rollers. The sixth and seventh, and eighth and ninth pairs of rollers are respectively provided with two additional beads and grooves, to impress upon the sheet two additional corrugations respectively, sixth and seventh corrugations 32 and 33 being of a depth proportional to the depth of the initial corrugation 26 in a ratio higher than that of the prior corrugations, and eighth and ninth corrugations 34 and 36 being of a depth proportional to the depth of the initial corrugation in a ratio of approximately one to three.

Rotatably mounted in the sides 12 and 13 upon shafts 37 are a series of eight idler gears 38, so located with respect of the forming rollers 20 as to each mesh with the gears 22 of two adjacent pairs of lower rollers, and to communicate the motion derived from one of said rollers to the other. In such manner the rotation impressed upon the power roller 18 by any suitable driving mechanism (not shown) is communicated to each roller of the series, to the end that they may be driven at the same rate of speed. A series of eighteen guard plates 39, rigidly secured to the sides 12 and 13 by screws 41 are positioned one to the immediate left of each roller so that a curved face 42 of a guard plate 39 is closely aligned with the curved surface of a roller. Each guard plate 39 is shaped to closely follow the contour of the roller with which it is associated to the extent that those associated with grooved rollers have V-shaped projections which conform with the grooves of the roller and those associated with beaded rollers have V-shaped notches to receive the beads thereon. The guards are arranged in upper and lower rows which are spaced sufficiently apart to permit the material to pass between them in a horizontal path, the curved faces 42 acting to prevent the material 14 from bending around a roller 20 as it is being formed.

A pressing apparatus, generally denoted by the numeral 43, includes a base 44, sides 45 and 46, a top 47 and an end portion 48. Rotatably mounted in the base and top portions of the pressing apparatus and suitably journalled therein on shafts 49 so as to be freely rotatable is a series of four pairs of oppositely disposed pressing rollers 50, each roller having a centrally located groove 51 extending about the periphery of the rollers in the same horizontal plane with the corrugating members 23 and 24 of the forming rollers 20. The depth of the grooves 51 of the first pair of pressing rollers 50 is such that an opening between the rollers is presented which will be of a width proportional to the width of the corrugated sheet discharged from the ninth pair of forming rollers in the ratio of approximately three to four. The grooves of the second pair of pressing rollers present an opening of a width proportional to the width of the corrugated sheet at the same stage in the ratio of approximately one to two. The grooves of the third pair present an opening proportional thereto in the ratio of approximately one to four. The grooves of the fourth and last pair of pressing rollers 51 present an opening of a width proportional to the width of the corrugated sheet in a ratio of approximately one to eight, the exact size of the grooves of the last pair of pressing rollers being determined by the ultimate cross-section and diameter which it is desired the finished core 15 to possess. The contour of the grooves of the first pair of rollers is such that the walls of each abut and closely engage the exterior edges of the corrugations for approximately 7/16 of the depth of each groove, to the end that the resulting compression of the material shall occur initially at the centermost corrugations, as shown in Fig. 3, thus insuring that the deeper and more resilient laminations occurring at the center of the sheet shall be compressed beyond the elastic limit and given a permanent set. Accordingly, the walls of the grooves of the second pair of rollers abut and closely engage the exterior edges of the corrugation for approximately 3/8 of the depth of a groove, and the walls of the grooves of the third pair of rollers similarly engage the edges for approximately 7/24 of the depth of a groove, the resultant tendency being to render the horizontal compressing force of the rollers effective only at the center of the material. The grooves of the last pair of rollers are hemispherical and act to compress the remaining corrugations and impart to the material its final predetermined cross section. The press rollers 50 receive the corrugated sheet from the last pair of forming rollers and forward it through the grooves 51 in a constantly horizontal path from right to left to progressively decrease its width in accordance with the approximate ratios stated. Stationary guide members 52 spaced between the compressing rollers assist in deflecting the sheet as it passes from a respective roller, to guide the edges of the material as it is passed into the subsequent roller. The last pair of pressing rollers 50 forward the completely formed one piece laminated prismatic core 15 through a discharge chute 53 which acts to load the cores 15 into a suitable type of annealing box (not shown) for heat treatment. Although the foregoing deals with the treatment of short lengths of sheet material which have been cut to determine the length of the complete core, it should be apparent that the invention is capable of similarly treating material coming in continuous lengths should such be found more convenient or economical. In such cases, the guard plates 39 and the guide members 52, being intended to lead projecting edges of successive sheets from roller to roller, will usually be found unnecessary once the continuous length of material is started through the system, and they may therefore be dispensed with.

A main idler gear 54 is keyed to a pin 55 rotatably mounted in side 13 of a forming apparatus so as to mesh with the last gear 22 of the forming apparatus. A series of four gears 56 is provided exteriorly of the side 45 mounted on horizontal shafts 57 which are rotatably journalled in sides 45 and 46 of the pressing apparatus. The first gear 56 meshes with the main idler gear 54 and acts to rotate the shafts 57. Mounted interiorly of the sides 45 and 46 on the shafts 57 so as to rotate therewith, is a series of eight driven gears 58 arranged in pairs which mesh with a series of eight beveled gears 59 arranged in pairs and suitably keyed to the shafts 49 of the pressing rollers 50 so as to cause rotation of the rollers in accordance therewith. A series of three minor idler gears 61 rotatably mounted on pins 62 mounted in the side 45 are individually spaced to connect the gears 56. A cooperation is thus established between the various series of gears in such manner that the main idler gear 54 rotates the first gear 56 of the pressing apparatus in accordance with the rotation of the last gear 22 of the forming apparatus. The gear 56 rotates the first shaft 57 to drive the first pair of driven gears 58. The driven gears 58 rotate the first pair of beveled gears 59 to rotate the first pair of rollers 50 which perform the first portion of the pressing operation and similar cooperation takes place between successive portions of the apparatus 43 in their respective order. The beveled gears 59 are respectively graduated in size to reduce the speed of revolution of the pressing rollers to correspond with the decrease in depth of the groove 51 surrounding the rollers in such manner that the material is forwarded through the pressing system at a constant speed regardless of the constantly decreasing depth of the successive grooves 51.

From the foregoing it will be observed that a sheet of material 14 inserted between guide plates 16 and fed into the forming rollers 20, is gripped by the first pair of rollers and moved to the left. The forming bead 23 impresses thereon, by reason of its engagement with the groove of the opposite roller, a crease or corrugation extending longitudinally through the center of the sheet. Each of the rollers comprising the remainder of the forming system engage the work successively and impress thereon additional corrugations, as explained above, to an extent that when the material emerges from between the final rollers it has been longitudinally corrugated at spaced points throughout its entire width, presenting an appearance as shown in Fig. 4. In passing between the rollers 20, any tendency of the material to curl or to deflect from its horizontal course is overcome by the guard plates 39 in such manner that the material is fed readily from roller to roller in the series without choking or rumpling. Upon emerging from between the final pair of rollers the sheet passes between the last guard plates and is forced by the rotation and feeding action of the final rollers 20 into the central grooves 51 of the pressing rollers 50. The pressing rollers, in respective pairs, rotate oppositely to each other to forward the material to the left, and each pair cooperate in succession to press the outer-most corrugations inwardly upon the center, through the agency of the grooves 51.

When the material emerges from the fourth pair of pressing rollers at the extreme left of the apparatus, it will be found to be shaped, as shown in Fig. 7 of the drawings, as a prismatic core of circular cross-section. It should be understood that a core of any other cross-section may be produced by suitably altering the relative size and positions of the beads and grooves on the forming rollers and the contour of the grooves on the pressing rollers. For instance, to form a core of rectangular cross-section, all of the beads on the forming rollers should be of the same height and equally spaced to produce in the material spaced corrugations of a uniform depth, and the sheet so corrugated should be subjected to pressing rollers having grooves of substantially rectangular cross section.

It is frequently found that machining operations of the class described produce in the material being treated certain internal stresses which, if allowed to remain unrectified, would prevent the attainment of the optimum magnetic properties in the core. The intimate contact which exists between adjacent laminations of the complete core would ordinarily adversely effect the efficiency thereof by increasing eddy current losses. To obtain the optimum magnetic properties in the core by rectifying the internal stresses, and to eliminate eddy current losses by producing an insulating oxide coating between all adjacent laminations of the core, the completely formed cores are subjected to an annealing treatment. The details of the annealing treatment may vary within certain well defined limits, in accordance with known characteristics of different materials used in making the cores. Examples of heat treatments which have proven satisfactory in rectifying internal stresses and producing an insulating oxide coating between each of the laminations of the core, briefly described are:

*Magnetic iron.*—Cores are given a standard shop anneal for one hour at 1650° F. in a sealed box.

*Silicon steel.*—Cores are given an open anneal for one hour at 1700° F.

The values given above are informative only, being but approximate, and it is to be understood that they are not intended to limit the scope of the invention, except as is consistent with the scope of the appended claims.

In accordance with the above description, a magnetic core will be produced which will be found to possess the maxima of desirable mechanical and magnetic characteristics, in that its one-piece or unitary condition causes it to be stronger, more rugged, and more easily handled than hitherto known types of laminated cores. The core itself is readily assembled without intermediate handling, and the fact that, though laminated, it is essentially a unitary article enables it to be readily machined to receive threaded screws for the support or attachment of other objects, or for its connection to other parts and apparatus, thus obviating many of the difficulties which have hitherto been encountered in handling laminated cores of the old loose-leaf type.

What is claimed is:

1. The method of producing a laminated magnetic core which consists in rolling a sheet of magnetic material to produce spaced corrugations therein, and further rolling the sheet to close certain of the corrugations one upon the other while the remaining corrugations are maintained apart.

2. The method of producing a laminated magnetic core which consists in rolling a sheet of magnetic material to produce spaced corrugations therein, rolling certain of the corrugations one upon the other while the remaining corrugations are maintained apart, and rolling the remaining corrugations together.

3. The method of producing a magnetic core which consists in forming a sheet of material to produce spaced corrugations therein, compressing certain of the corrugations without changing the remaining corrugations and thereafter compressing the remaining corrugations.

In witness whereof, I hereunto subscribe my name this 26th day of February, A. D., 1929.

KENNETH LOYAL SCOTT.